Figure 1:
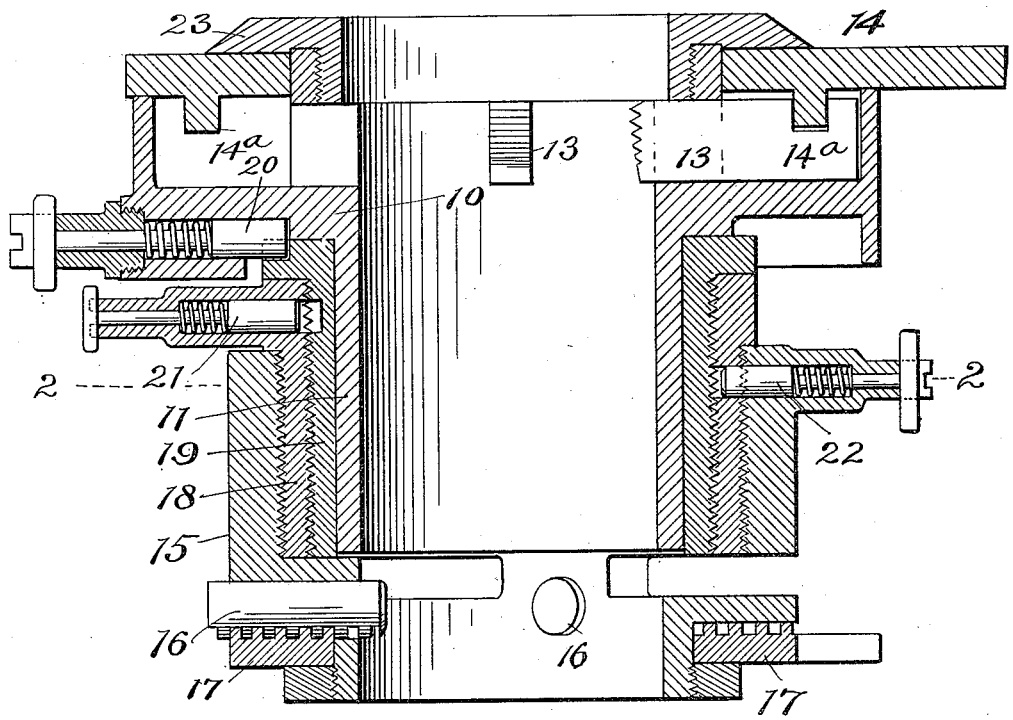

R. B. TEWKSBURY.
THREAD CUTTING TOOL.
APPLICATION FILED SEPT. 20, 1912.

1,052,769.

Patented Feb. 11, 1913.

Witnesses.
E. B. Gilchrist
E. M. Freeman.

Inventor.
Russell B. Tewksbury
by Thurston & Kwis
Attorneys

COLUMBIA PLANOGRAPH CO., WASHINGTON, D. C.

UNITED STATES PATENT OFFICE.

RUSSELL B. TEWKSBURY, OF CLEVELAND, OHIO, ASSIGNOR TO THE OSTER MANUFACTURING COMPANY, OF CLEVELAND, OHIO, A CORPORATION OF OHIO.

THREAD-CUTTING TOOL.

1,052,769.

Specification of Letters Patent. Patented Feb. 11, 1913.

Application filed September 20, 1912. Serial No. 721,347.

*To all whom it may concern:*

Be it known that I, RUSSELL B. TEWKSBURY, a citizen of the United States, residing at Cleveland, in the county of Cuyahoga and State of Ohio, have invented a certain new and useful Improvement in Thread-Cutting Tools, of which the following is a full, clear, and exact description.

This invention consists in certain improvements in the kind of thread cutting tools which include two members having a lead screw connection with each other, viz., a die carrier, and a work holder. It is to be understood, however, that the term die carrier is not restricted to the member which actually carries the dies, but includes also so much of the device as is so connected with the actual carrier of the dies as to be compelled to share with it all conditions of rest or motion. Also the term work holder is not to be understood as restricted to the precise member which directly engages with or actually holds the work,—but also includes so much of the device as is so connected with the specific work holder as to be compelled to share with it all conditions of rest or motion.

When a die carrier and work holder, as those terms have been defined, have a lead screw connection with each other, it is obvious that when one of said members is rotated relatively to the other, one of them must also move longitudinally relatively to the other at a rate determined by the pitch of the engaging lead screw threads. Those familiar with this art will understand that it is theoretically a matter of no consequence whether the die carrier or work holder actually turns or moves endwise. In fact the character of the thread cutting tool in other respects, and particularly considerations of the character of the "work" to be threaded are usually the factors which determine which of these two parts shall have the actual rotary or endwise movement.

The invention is shown incorporated in a so-called die stock, that is to say, a tool which includes a tubular work-holder which is adapted to embrace and be clamped to an immovable piece of "work", and a tubular die carrier, on which the dies are mounted, which die carrier screws into the work holder, is actually turned, and as a result actually moves endwise relatively to the work holder, as the thread is being cut on the "work."

It is obvious that in a tool of the character specified, the pitch of the teeth on the dies must correspond with the pitch of the threads of the connecting lead screw. This very clearly restricts the use of the tool to the cutting of threads having this particular pitch.

The object of this invention is to increase the field of usefulness of thread cutting tools of the character specified,—and the invention consists broadly in the interposition between the die carrier and work holder of a sleeve which screws into one of said parts, and may or may not be screwed into or upon the other,—and means whereby this sleeve may be disconnected from either and be so connected with the other as to be compelled to share with it, its condition as to rotary motion. The invention is not, however, limited to the use of one such sleeve, and connecting means,—but, on the contrary, said sleeves may be multiplied to any practical extent, and each additional sleeve imparts to the tool the capacity for using dies (and consequently cutting threads) of a different pitch.

Figure 2:
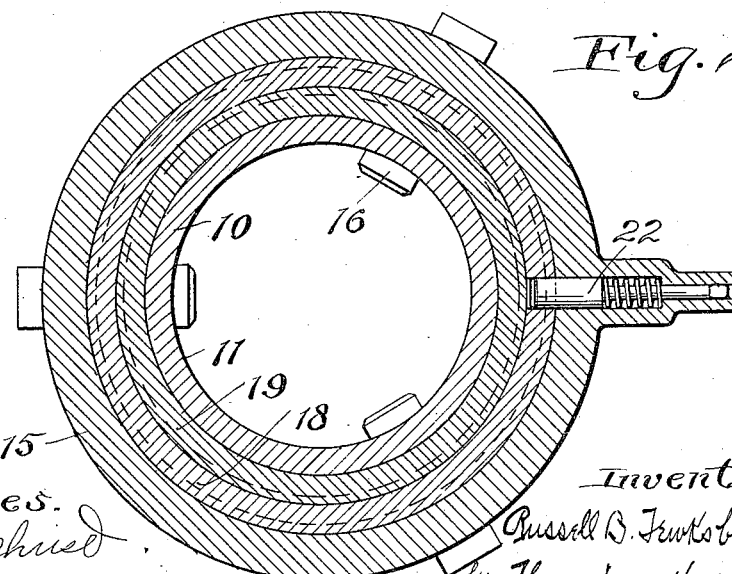

In the drawing, Figure 1 is a central longitudinal section of a die stock in which the present invention is embodied; and Fig. 2 is a transverse sectional view in the plane indicated by line 2—2 on Fig. 1.

The die carrier 10, as shown, is of well known form. It has a rearward tubular cylindrical extension 11. In its front end are guideways for the reception of the radially movable dies 13. These dies are caused to move toward or from the axis of the tool by means of a cam plate 14 which is rotatively mounted upon the die carrier, and has cam scrolls 14$^a$ for engagement with the dies. So much of the tool shown is of familiar construction, and therefore needs no further explanation or illustration. The work holder 15 is also of familiar form in that it is tubular and carries radially movable pins 16 and a cam plate 17 for moving the pins, whereby they may be caused to move inward to clamp the work holder to the work to be threaded, or to move outward to release such work.

The work holder is internally threaded. A sleeve 18 is correspondingly threaded externally, and is screwed into the work holder. This sleeve is also threaded internally, but the internal threads are all of different pitch to the external threads. A sleeve 19 screws into sleeve 18. The sleeve 19 has a smooth cylindrical interior within which the tubular extension 11 of the die carrier is nicely fitted. Means are provided for connecting the work holder, the die carrier, and these two sleeves into two groups,—that is to say, the die carrier may be connected with the sleeve 19, in which event the work holder would also be connected with the sleeve 18. Under these conditions, if the die carrier be turned, the sleeve 19 will be screwed into the sleeve 18, thereby causing the die carrier to move longitudinally as it is turned at a rate determined by the pitch of the engaging threads on the two sleeves. When the parts are connected as stated, the dies 13 employed in the tool must have their cutting edges formed on the same pitch as the engaging screw threads on sleeves 18 and 19. Or the sleeves 18 and 19 may both be connected with the die carrier. Wherefore when it is turned relative to the work holder, these sleeves turn in unison with it, and the sleeve 18 screws into or out of the work holder 15. The longitudinal movement of the die carrier relative to the work holder will therefore be such as is determined by the pitch of the engaging threads on the work holder and sleeve 18. When the parts are connected in this manner the dies 13 used in the tool must have their cutting teeth formed with a pitch corresponding with the pitch of the engaging threads on the work holder and sleeve 18. Or both of the sleeves 18 and 19 may be connected with the work holder 15. In that event, when the die carrier is turned relative to the work holder, it will turn in sleeve 19. When the parts are connected in the manner stated, the dies 13 used with the tool may have any pitch provided their teeth are so formed that they will make their own lead on the work, as the work is being threaded. The particular mechanism for connecting these sleeves and work holder and die carrier to form the two different groups is merely typical and not at all essential in the particular form shown to the invention. There is a plunger 20 carried by the die carrier, and spring actuated inward so that its inner end may engage a notch in the sleeve 19. A cross bar on the outer end of this plunger may go into an adjacent slot in the die carrier, as shown, and thereby allow the plunger to move inward into engagement with sleeve 19. If, however, this plunger is withdrawn and turned so that the head will not register with said slot, the plunger will be held out of engagement with sleeve 19. A similar plunger 21 is carried by sleeve 18 for engagement with a notch in sleeve 19. A similar plunger 22 is carried by the work holder for engagement with the sleeve 18. It might be here stated that the cam plate 14 is held on the die carrier and in operative relation to the dies by a tubular cap plate 23, which screws into the die carrier, although any other means for accomplishing this result would serve as well.

Having described my invention, I claim:

1. In a thread cutting tool, the combination of a die carrier, and a work holder, with a sleeve interposed between said members and having a screw thread engagement with one of them, and means whereby said sleeve may be disconnected from either and at the same time be so connected with the other of said parts as to be compelled to share with it its condition as to rotary motion.

2. In a thread cutting tool, the combination of a tubular work holder adapted to embrace and to be clamped upon the work to be threaded, a tubular die carrier which telescopes into the work holder, a sleeve which is intermediate of these two telescoping parts and engages with them, one of said engagements being formed by engaging screw threads on the said sleeve and one of the other parts, and means whereby to connect said sleeve either with the work holder or die carrier, and thereby to compel it to share the condition as to rotary motion of the part with which it is connected.

3. In a thread cutting tool, the combination of a tubular work holder, a tubular die carrier which telescopes into the work holder, and a plurality of sleeves which telescope one within another, which plurality of sleeves occupies a position intermediate of the work holder and die carrier, one of said sleeves having a screw thread engagement with die carrier or the work holder, and the several sleeves having screw thread engagements serially with one another, and means whereby to connect the parts mentioned into two relatively rotatable groups, one group comprising the work holder and any desired number of sleeves, and the other group comprising the die carrier and the remaining sleeves.

In testimony whereof, I hereunto affix my signature in the presence of two witnesses.

RUSSELL B. TEWKSBURY.

Witnesses:
A. J. HUDSON,
E. L. THURSTON.